United States Patent [19]

Bavoux et al.

[11] 4,355,356

[45] Oct. 19, 1982

[54] PROCESS AND DATA SYSTEM USING DATA QUALIFIERS

[75] Inventors: Robert J. A. Bavoux, Rueil Malmaison; Francis R. J. M. Lemaire; Pierre Salkazanov, both of Plaisir, all of France

[73] Assignee: Compagnie Internationale pour l'Informatique CII-Honeywell Bull (Societe Anonyme), Paris, France

[21] Appl. No.: 135,098

[22] Filed: Mar. 28, 1980

[30] Foreign Application Priority Data

Apr. 6, 1979 [FR] France .................................. 79 08715

[51] Int. Cl.³ ............................................. G06F 13/00
[52] U.S. Cl. .................................................. 364/200
[58] Field of Search ... 364/200 MS File, 900 MS File

[56] References Cited

U.S. PATENT DOCUMENTS

| 2,843,841 | 7/1958 | King . | |
|---|---|---|---|
| 3,434,116 | 3/1969 | Anacker | 364/200 |
| 3,633,175 | 1/1972 | Harper | 364/200 |
| 3,725,872 | 4/1973 | Balogh, Jr. | 364/200 |
| 3,818,459 | 6/1974 | Vrablik | 364/200 |
| 3,828,327 | 8/1974 | Berglund | 364/200 |
| 3,893,084 | 7/1975 | Kotok | 364/200 |
| 4,045,779 | 8/1977 | Markle | 364/200 |
| 4,058,851 | 11/1977 | Scheuneman | 364/200 |

FOREIGN PATENT DOCUMENTS

1254929 11/1971 United Kingdom .

Primary Examiner—Raulfe B. Zache
Attorney, Agent, or Firm—Kerkam, Stowell, Kondracki & Clarke

[57] ABSTRACT

The invention relates to data processing systems making use of an addressable memory. It proposes a process and system permitting qualifying terms to be associated with the data contained in the data memory by writing these qualifying terms at locations associated with the data within a qualifier and set aside for this purpose. These qualifying terms are characteristics of the data or the processing undergone by the data. The qualifier memory, which is interfaced with the processor as though it was a peripheral I/O device, uses an INTERUPT to alert the processor of the occurrence of a call on data which has an associated qualifier.

16 Claims, 7 Drawing Figures

PROCESS AND DATA SYSTEM USING DATA QUALIFIERS

Cross-reference is made to co-pending applications Ser. Nos. 135,079 and 135,097, filed Mar. 28, 1980, by the same inventors and assigned to the same assignee as the present invention.

The invention relates to addressable data storage devices utilised in data processing systems and essentially has as its object a process and a system of data processing having an addressable memory making it possible to qualify the data of the memory by association of qualifying terms with the data.

In a data processing system, the processing unit draws the data in accordance with its requirements from a data memory. In particular, it is in the memory that it seeks instructions of the program in the course of execution. During the setting up and servicing periods, a check and test are performed regarding the different instructions constituting the current setting up or test program. For example, in order to be certain of the exhaustive nature of the tests performed upon completing the operation, it is necessary to make certain that all the instructions have been checked and tested. At present, there is no simple means of obtaining this certainty. One of the possible means is the recording in a memory of all the addresses called up. This method requires supplementary memory locations and protracted processing during analysis since, the consecutive instructions not necessarily being situated at equally consecutive addresses, it is necessary to carry out a preliminary sorting operation before performing a check.

In order to alleviate the aforesaid shortcomings, the invention proposes a process and an arrangement consisting in associating with each item of data contained in the data memory a qualifying term or qualifier monitored by the processing unit and of which the function is to enable the processing unit to recognise, as required, the characteristic of an item of data by reading this associated qualifier.

To this end, the invention has as its object a process for processing of the data contained in an addressable memory of the kind consisting in associating qualifying terms or qualifiers with the said data contained in the said addressable memory and in utilising the said addressable memory whilst, in particular, addressing the said data from the processor characterised in that the said qualifier associated with the data comprises the recording of qualifying storage terms or qualifiers in to qualifying means associated with the said data, the said qualifiers generated by the processor, and in that the said utilisation of the said addressable memory comprises the control of the said qualifying means each time that an item of data is addressed in order to generate an item of information relating to the said qualifier associated with the said item of data addressed and to transmit this said information to the said processor.

When setting up or repairing a data processing system making use of an addressable memory and microprocessors, the system according to the present invention advantageously renders it possible to associate with the data, qualifying terms characteristic of the data or characteristic of the processing undergone by the data. These qualifying terms enable the processor to recognize a particular kind of information at any time. Checking and testing operations on the data, as is the case during setting up and servicing periods, are facilitated by the present invention.

The present invention is also useful in industrial or other automated mechanisms, as for example, when the execution of particular operations is accompanied by recording parameters relating to this execution such as tolerance limits. The reading of these qualifying parameters during periodic checking operations renders it possible to ascertain the drift in the settings of the automated mechanisms.

According to another feature of the process of the invention, the said qualifiers have different values or configurations, which said different configurations are defined by the processor.

According to another feature of the process of the invention, the aforesaid qualifier is input to an intermediate storage stage preceding the said writing in the said qualifying means, into which said intermediate stage the processor transmit the said qualifier to intermediate means which, for their part, transmit the said qualifier for writing in the said storage means and the use of the said addressable memory comprises the stimulation of the intermediate means for the transmission to the said processor of the said information relating to the said qualifier.

According to another feature of the process of the invention, the said transmission of the said information relating to the said qualifier comprises a first phase of notifying the processor of the presence of the qualifier in the said qualifying means and a second phase in which the said qualifier is transmitted in its turn at the call of the said utilisation means which had been alerted during the said first phase.

The invention equally relates to a data processing system for implementation of the process corresponding to the features mentioned above and of the type comprising:

at least one addressable data memory for storing data,
data processing means for exploiting the said data,
these said processing means or processor comprising:
  processing circuits for processing the said data,
  addressing circuits for addressing the storage locations of the said data in the said data memory on instructions from the said processing circuets,
  an input-output buffer store connected to the said processing circuits and intended to contain the said data forming the object of an exchange between the said processing circuits and the said addressable memory.

The said data processing system also comprises coupling means incorporating;

an address bus for connecting the said addressing circuits to the said data memory,
a data bus for connecting the said input-output buffer register to the said data memory,
a control bus for controlling the exchanges of data between the said processing circuits and the said addressable memory.

This exploitation system is characterised in that it comprises means for qualifying the said data contained in the said addressable data memory in order to quality the said data on instructions from the said processing means by writing a qualifying term or qualifier at locations associated with the addresses containing the said data, which associated locations respond to the calls to the said addresses by the said processing circuits by sending items of information relating to the said qualifiers to the said processing circuits.

The invention equally relates to a data processing system characterised in that it comprises intermediate storage means situated between the said processing circuits and the said qualifying means in order to control the exchanges of the said items of information relating to the said qualifiers between the said processing circuits and the said qualifying means in order to enable the said processing circuits to defer the use of the said qualifiers.

According to another feature of the invention, the said intermediate means have a checking device for informing the said processing circuits that they have called for one of the said data items having an associated qualifying term.

According to another feature of the invention, the said associated locations are contained in a qualifier memory which is a memory analogous to the said data memory of which the addressing is provided by the said circuits for addressing in the processor.

According to another feature of the invention, the said intermediate storage means is formed by an addressable device of the kind commonly utilised to connect a processor means to peripheral devices with which they exchange data.

The invention obviously envisages the use of integrated circuit boards, modules or the like, equipped with a logic system corresponding to the preceding features.

Other objects, features and advantages of the present invention will emerge more clearly from the following description given with reference to the accompanying drawings, which illustrate preferred embodiments of the invention.

Figure 1:
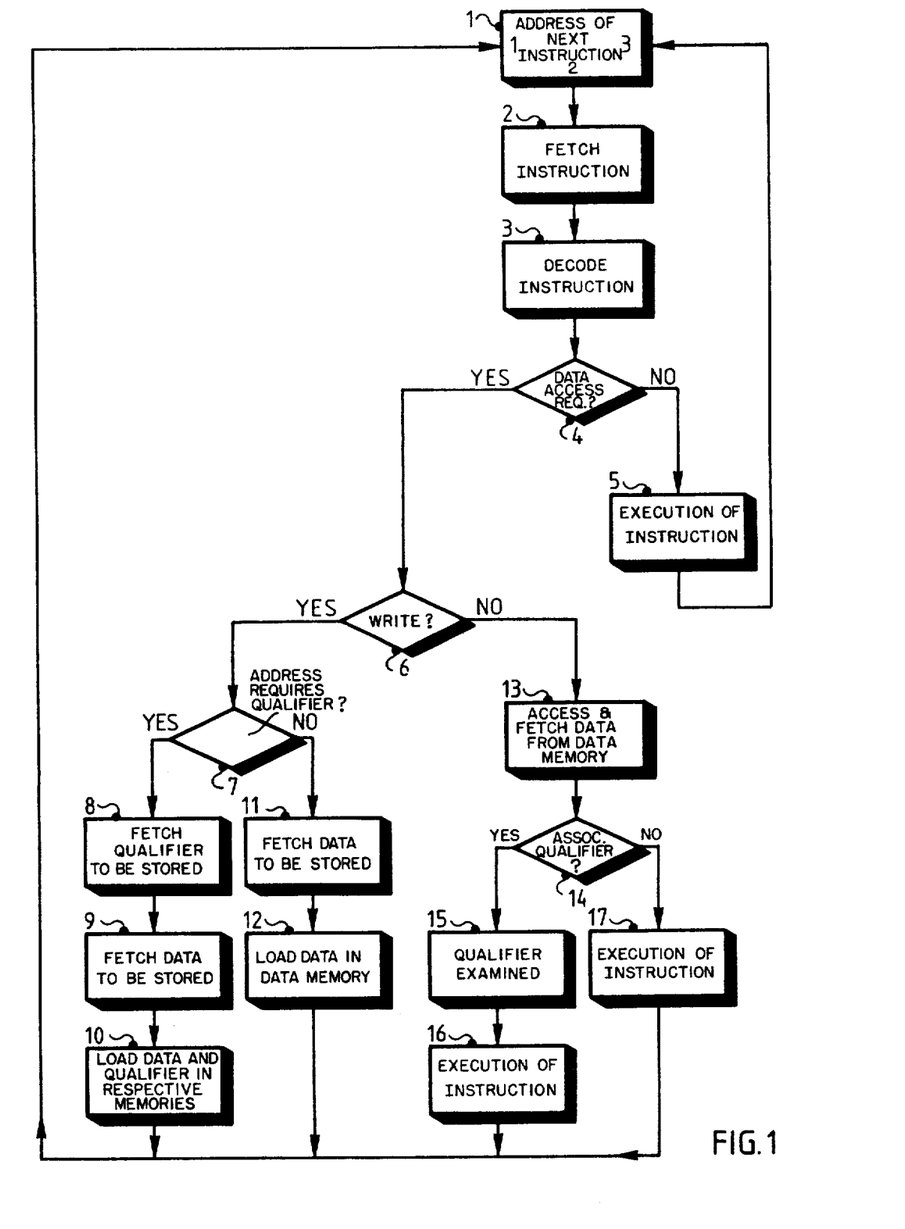
FIG. 1 illustrates the sequence of the operations which occur within a data processing system making use of the process of the invention.

In order to illustrate the process forming the object of the invention, FIG. 1 illustrates the sequence of the operations occurring within a data processing system making use of the said process.

For the sake of clarity of the description, let it be assumed that this process relates to the operation of a data processing system comprising, among other items, a microprocessor and associated circuits such as have been disclosed, for example, in the document published by the "MOTOROLA" company during the month of February 1976, bearing the reference 9701-5 (IMPERIAL LITHO B 55769) and entitled M6800 MICROCOMPUTER SYSTEM DESIGN DATA. During its operation, the microprocessor must obtain instructions contained in an addressable memory which will be referred to as data memory. The address of the instructions which are to be obtained is contained in an ordinal or instruction counter. This address is transmitted to the addressable memory which in exchange, on request of a read cycle, will transmit the contents of the address thus called for. The instructions thus obtained are placed in an instruction register. From this register, the instructions are decoded in order to deduce therefrom the operations required for their execution by the processing circuits. Conversely, the microprocessor may store instructions or data in the addressable memory by calling the storage address, by transmitting the instructions or data which are to be recorded and by calling for a cycle for entering or writing in the memory. When an instruction has been obtained, the microprocessor controls the progression of the ordinal counter: the content of the counter is then the address of the next instruction.

In FIG. 1, the block 1 denotes the operation for defining the address of the next instruction. The authorisation to undertake this definition is received via the terminals 1 or 3 of the block 1. When this address has been defined, the system performs the acquisition of the instruction contained at this address. This acquisition is denoted by block 2. This operation is followed by the operation for decoding the instruction, which is illustrated by the block 3. This decoding action enables the system to ascertain the nature of the operation defined by the instruction. It is thus possible to determine whether these operations require a cycle of the data memory.

If the instruction does not have recourse to the memory, it is executed in 5 and at the end of execution, the order is given to the program to pass on to the following instruction by an end of execution signal applied to the input terminal 3 of the block 1.

If the instruction has recourse to the memory, it is determined in 6 whether the memory cycle requested is a read cycle or a write cycle.

In the case of a write cycle, the system determines at 7 whether the address called should be tagged with a qualifier associated with the data contained at this address. In the affirmative case, the system performs the acquisition at 8 of the configuration of the associated qualifier. The system thereupon performs the acquisition at 9 of the data to be stored in the memory. Finally, at 10, the system on the one hand performs the loading of the associated qualifier into the qualifier memory, and on the other hand, the loading of the data into the data memory. These two loading operations having been completed, the system actuates the progression of the programme via the input terminal 1 of the block 1.

If the write cycle does not comprise a qualifier co-ordinated with the data which is to be stored, the system performs at 11 the acquisition of the data which is to be stored, at 12 it performs the loading of the data into the data memory and then it restarts the progression of the programme via the terminal 1 of the block 1.

If the cycle requested from the memory is a read cycle, the system will perform this cycle in 13. The result of this cycle is examined in 14.

If the cycle has yielded a data item as a result and the address at which this data was found comprises an associated qualifying term, this qualifying term is examined in 15. This qualifying term characterises the data read and the microprocessor effects the corresponding treatment at 16. The completion of this treatment restarts the evolution of the programme via the input terminal 1 of the block 1.

In the case in which the read cycle has not disclosed the presence of a qualifier, the data obtained is exploited in 17 in accordance with the instruction loaded into 2. Once this operation is completed, the programme regains control by action on the input terminal 1 of the block 1.

To summarise, it may be stated that the programme comprises data particularised by qualifiers. This particularisation is secured during the write operation by attaching an associated qualifier to the data in question. Upon reading a particularised item of data, the call to this particularised item of data elicits the appearance of the qualifying term associated with this data. This qualifier supplies the system with information regarding the data with which the qualifier is associated. For example, this qualifier may comprise the indication of a treatment undergone by the data.

Figure 2:
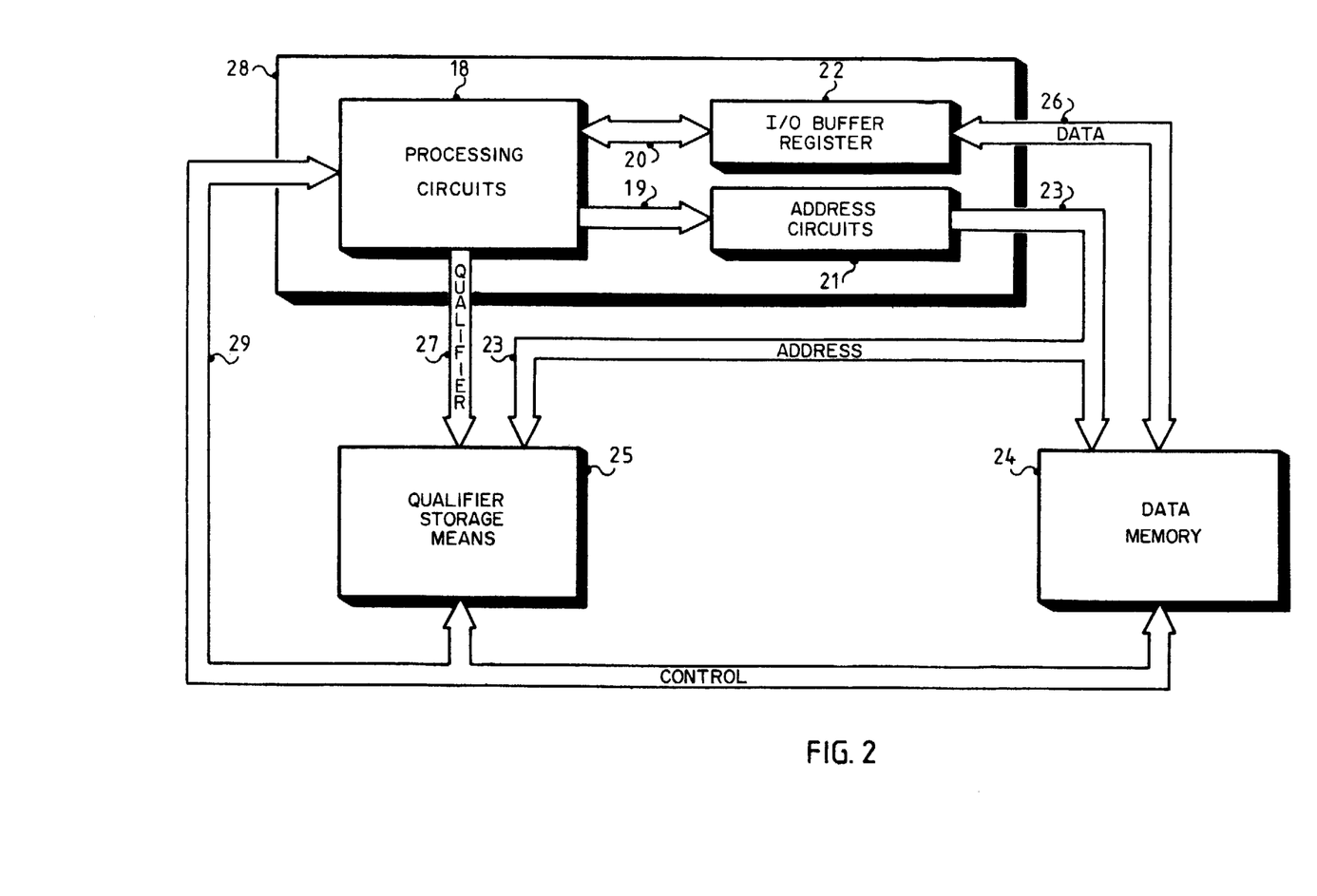
FIG. 2 is a diagrammatic illustration of an arrangement enabling the application of the process depicted in the preceding Figure.

In FIG. 2 is illustrated a data processing system applying the process which has been described. The processing system is illustrated in the form of functional blocks. The functional block 28 represents the data utilisation means. Within this block are illustrated:

at 18, the data processing circuits,
at 21, the addressing circuits,
at 22, the input-output buffer register.

The data processing circuits 18 are connected via a connection 19 to the addressing circuits 21, via a connection 20 to the input-output buffer register 22, via a connection 27 to the storage means 25, and via a connection 29 to the data memory 24 and to the qualifying means 25. The connection 27 is the qualifier bus and the connection 29 is the control bus. The output of the addressing circuits 21 feeds the address bus 23. The output of the buffer register 22 feeds the data bus 26. The address bus 23 is connected to the data memory 24 and to the qualifying means 25. The data memory 24 consequently has three input terminals which are fed, respectively, by the address bus 23, the control bus 29 and the data bus 26. The qualifying means 25 equally comprises 3 input terminals which are fed, respectively, by the address bus 23, the control bus 29 and the qualifier bus 27. When the processing circuits 18 are to exchange data with the data memory 24 and a qualifier with the qualifying means 25, they put the address of the location at which are situated the aforesaid data and the qualifier, on the connection 19 which feeds the addressing circuit 21, the latter feeding the address bus 23 which on the one hand addresses a location in the data memory 24 and on the other hand addresses a location within the qualifying means 25, and it is apparent that the address of these two locations is the same address in the two devices. It is sufficient for the qualifying means to have a location available for each of the data items which are to be qualified in order to enter therein the corresponding qualifier. Morever, the processing circuits 18 put on the control bus 29 the signals specifying the nature of the operating cycle required from the memories 24 and 25. If the processing circuits 18 wish to obtain a write cycle they must, before initiating this write cycle, on the one hand cause the data which is to be stored to be applied to the connection 20 which feeds data to the buffer register 22 and on the other hand, in the case of a data item which is to be qualified, to put the qualifier corresponding to this address, on the qualifier bus 27. Once these operations have been completed, the processing circuits 18 initiate the write cycle which, respectively, feeds the data situated on the data bus 26 into the data memory 24, and the qualifier positioned on the qualifier bus 27 into the qualifying means 25.

Consequently, as is apparent from the preceding description, the processing circuits 18 may enter a data item in the data memory 24 during a write cycle, and if this data item should be qualified, may enter the qualifier corresponding to this data item in the qualifying means 25. This qualifier will be referred to in the following as the qualifier associated with the qualified data item.

In the case of a read cycle the addressing operations are the same as above, but the processing circuits 18 actuate a read cycle via the control bus. This read cycle places the data item contained at the location addressed at the output terminal of the data memory 24 and consequently on the data bus 26. The data bus 26 transmits this data item read out to the input-output buffer register 22 which, for its part, transmits this data item to the processing circuits 18 via the connection 20.

A read cycle has equally been performed in parallel in the qualifying means 25. If a qualifier is situated at the location addressed, which is consequently situated at an address associated with that of the data item which proves that the data item is a qualified data item, this qualifier is put at the output terminal of the qualifying means 25 and is simultaneously transmitted to the processing circuits 18 via the bus 27. If the read-out of this address in the qualifying means 25 does not provide a qualifier, this indicates that this data item is not a qualified data item, and no signal is fed to the qualifier bus 27.

Figure 3:
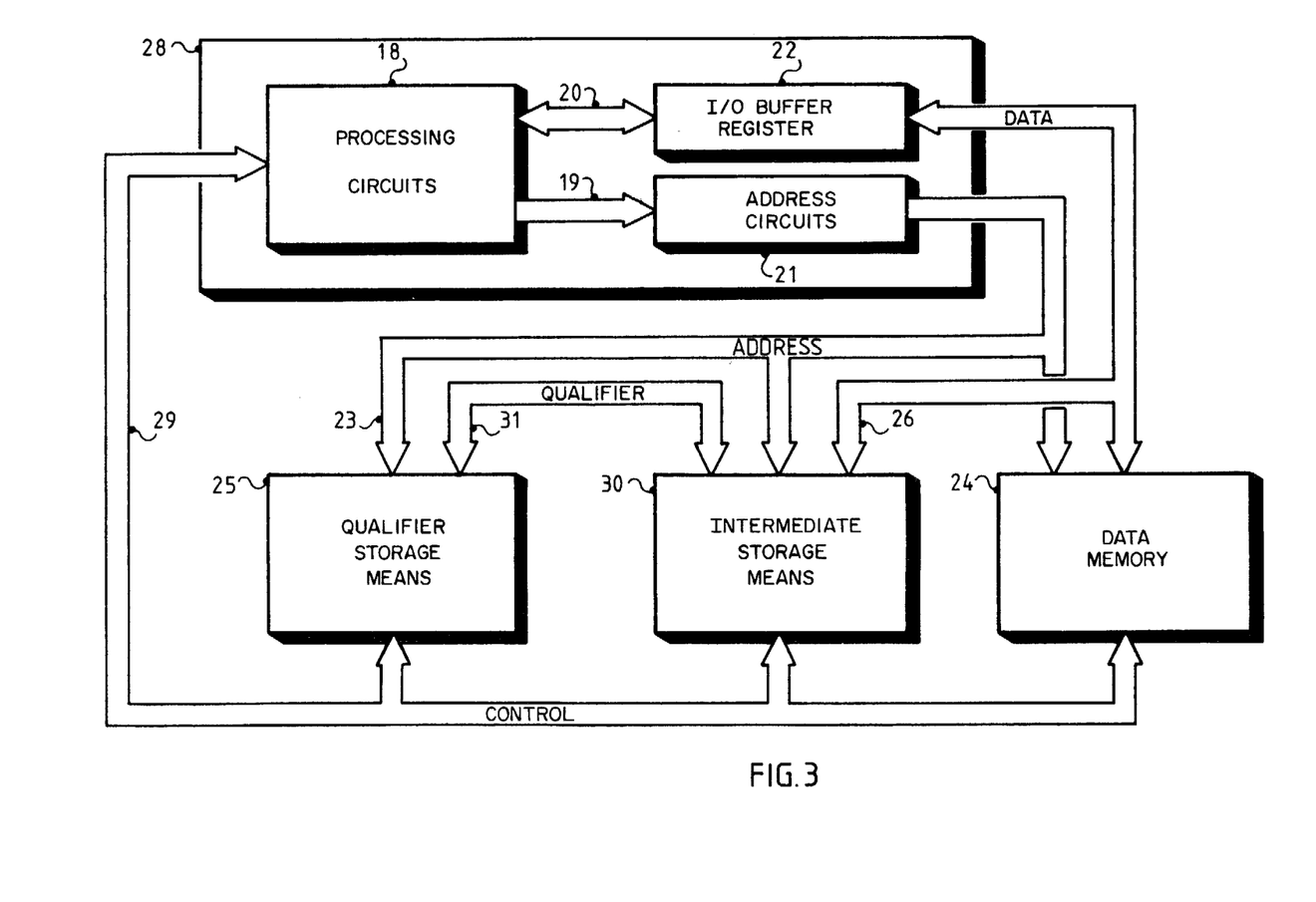
FIG. 3 is a diagrammatic illustration of a modified form of the arrangement illustrated in FIG. 2, FIG. 4 diagrammatically illustrates an embodiment of the version of FIG. 3 based on a MOTOROLA MC 6800 microprocessor.

In FIG. 3 is illustrated a modified form of the system illustrated in FIG. 2. In this version, intermediate storage means 30 have been interposed between the utilisation means 28 and the qualifying means 25. The transmission of the qualifiers no longer occurs directly via a qualifier bus 27. The qualifying means 25 are connected to the address bus 23, to the control bus 29 and to the bus 31 for the deferred qualifiers. The deferred qualifier bus 31 is connected at its other end to the intermediate storage means 30. This intermediate means 30 are equally supplied by the address bus 23 and the data bus 26.

When the processor 28 is to write a data item into the data memory 24 whilst associating a qualifier with the data item in question, they proceed in the following manner. They put the address of the intermediate means 30 on the address bus 23, the qualifier to be associated with the data item on the data bus 26, and place the order to perform a write cycle on the control bus 29. This group of signals applied to the intermediate means 30 causes the insertion of the qualifier into the intermediate means 30. During the following cycle, the utilisation means 28 place the address at which the entry is to be written on the address bus 23, place the data item to be entered in the data memory 24 on the data bus 26, and place the order to perform a write cycle on the control bus 29. This group of signals applied to the data memory 24 and to the qualifying means 25 will cause a write cycle to be performed on these two memories 24 and 25. For the data memory 24, this write cycle will cause the data item situated on the data bus 26 to be stored at the location of the data memory 24 defined by the address situated on the address bus 23. For the intermediate means 30, this write cycle actuation will place the qualifier received earlier, on the deferred qualifier bus 31. For the storage means 25, this write cycle causes the qualifier situated on the deferred qualifier bus 31 to be stored at the location of the qualifying means 25 defined by the address situated on the address bus 23.

When the processor 28 are to read the contents of a location of the data memory 24, they put the address of the location which is to be read on the address bus 23, and initiate a read cycle on the control bus 29. The arrival of the signals put on these two buses at the data memory 24 triggers the execution of the read cycle of the data memory 24. This read cycle puts the data item contained in the location denoted by the address on the address bus 23, on the data bus 26. During the same period, the qualifying means 25 receive via the bus 23 location addresses read in the data memory and via the control bus 29 receive a read order, and perform a cycle for reading the contents of the location of the qualifying means 25 having the same address as that called for in the data memory 24. If there is a qualifier stored at this location, the read cycle puts this qualifier on the deferred qualifier bus 31. This deferred qualifier bus 31 transmits this qualifier to the intermediate devices 30. In order to ascertain whether the data item called for comprises an associated qualifier, the processor 28 pass a request, by means of an appropriate order placed on the control bus 29, to the intermediate means 30 to cause the latter to place on the data bus 26 the result of the reading taken at the address called on within the qualifying means 25. If there is no associated qualifier, no signal of any kind will be transmitted on the data bus 26. If there is an associated qualifier, this qualifier will be placed on the data bus 26.

According to a modified form of the exploitation system which has been described, after an operation reading the contents of a location defined by an address, the qualifying means 25 advise the processor 28 in the case of detection of the presence of a qualifier associated with the data item called. To this end, they put a signal on the control bus 29, advising the processor 28 of the presence of a qualifier associated with the data item called. This action informing the processor 28 of the presence of this qualifier avoids having to request a special cycle from the intermediate means 30.

According to another version of the data processing system, the qualifying means 25 comprise a memory analogous to the data memory 24. This memory is referred to as qualifier memory 25 by virtue of its resemblance to the data memory 24.

According to an embodiment of the processing system, the intermediate means 30 comprise an addressable device analogous to those utilised to connect the processor 28 to peripheral devices. The processor 30 are considered by the processor 28 as a particular peripheral device. The system and its modified forms will be understood more clearly with reference to FIG. 4 which illustrates a preferred embodiment of the invention produced around a MOTOROLA MC 6800 microprocessor.

Figure 4:
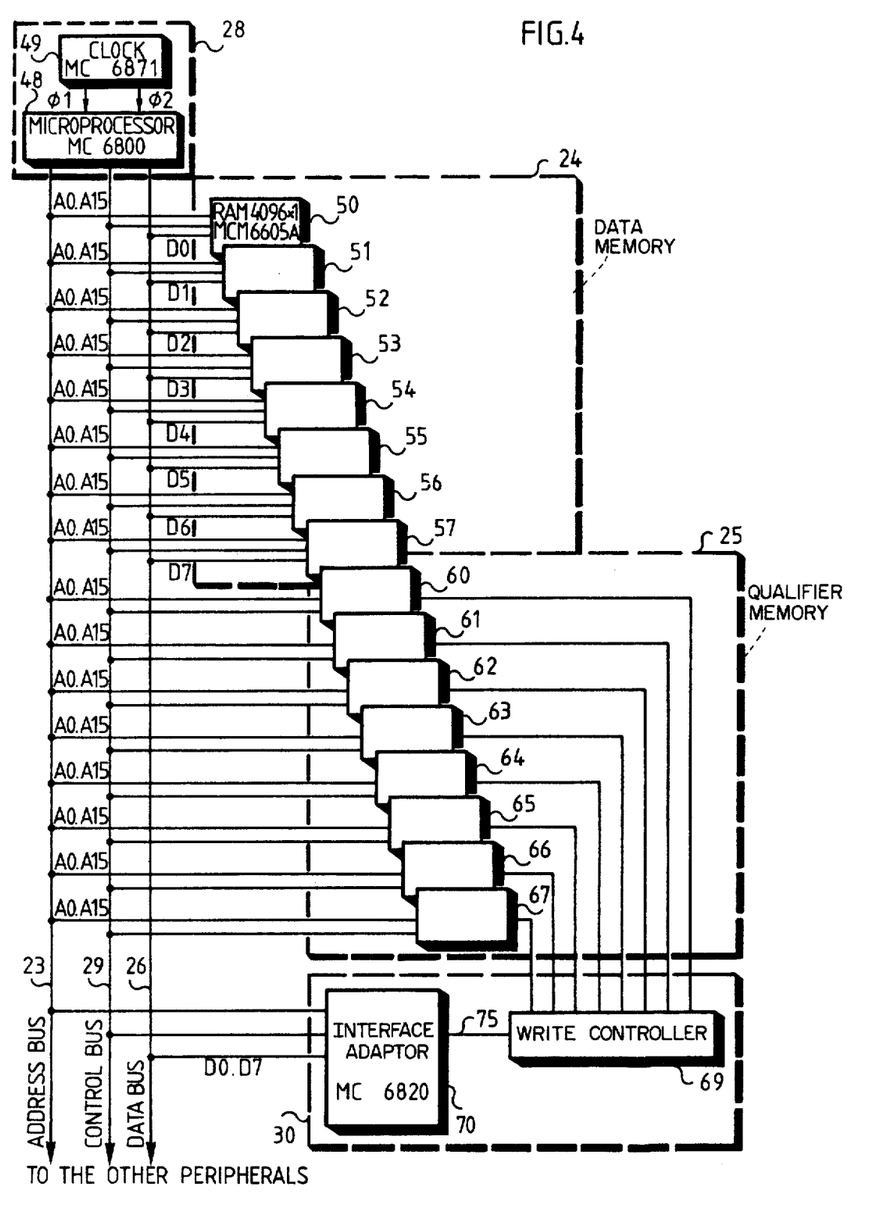

The utilisation means 28 comprise a clock 49 of the MOTOROLA MC 6971 type, and a microprocessor 48 of the MOTOROLA MC 6800 type.

The MC 6871 clock 49 generates two synchronising signals which define the phases of operation of the whole of the system. These two signals are respectively referred to as $\phi 1$ and $\phi 2$. These signals are transmitted to the microprocessor 48.

The microprocessor 48 is connected to the remainder of the system which it controls by means of three buses:

an address bus 23 which carries the address called by the microprocessor 48. It comprises 16 lines, each representing one of the binary weights defining the address. These lines are referenced in the following text by A0, A1, A2, A3, A4, ... A14, A15.

a data bus 26 which assures the interchange of data between the microprocessor 48 and the different circuits it controls. It comprises 8 lines, each representing one of the binary weights defining the data item forming the object of the exchange. These lines are referenced by D0,D1,D2,D3,D4,D5,D6,D7.

a control bus 29 which authorises the microprocessor 48 to transmit orders to the circuits controlled and to receive the answers of the latter. It comprises lines carrying the following signals:

the clock signals $\phi 1$ and $\phi 2$.

the initialisation signal, which will be referred to by INITIALIS, and which serves the purpose of resetting the circuits in an initial condition.

the write cycle order signal which will be marked WRITE and which, when it is at a high level, controls the execution of the write cycle, whereas when it is at a low level it controls the execution of a read cycle.

the signal for validation of the address put on the address bus 23, which is marked by SELECTION.

the signal for screening interruptions, which will not be considered in the following description.

the signal requesting an interruption marked INTERRUPT, which is generated by the controlled circuits when these call for an intervention from the microprocessor 48.

The MOTOROLA technical specification cited in the foregoing gives all the details relating to these signals and to their utilisation.

The data memory 24 comprises 8 integrated circuits of the MOTOROLA MCM 6605A type. These circuits are illustrated at 50, 51, 52, 53, 54, 55, 56, 57. Each of these circuits is an addressable memory comprising 4096 locations of a capacity of 1 bit. The circuit 50 stores the 0 bits of the data, the circuit 51 stores the 1 bits, and so on, up to the integrated circuit 57 which stores the bits 7.

The qualifier memory 25 is analogous to the data memory 24. This also has 8 circuits referenced 60, 61, 62, 63, 64, 65, 66, 67. The integrated circuit 60 stores the 0 bits of the qualifiers and so on up to the integrated circuits 67 which stores the 7 bits of the qualifiers.

The locations of these two memories 24 and 25 are addressed by means of the address bus 23.

The data memory 24 exchanges the data it stores with the microprocessor via the data bus 26: the circuit 50 exchanges the bit 0 via the wire D0, the circuit 51 exchanges the bit 1 via the wire D1, and so on up to the circuit 57 which does so via the wire D7.

The qualifier memory 25 exchanges the bits of the qualifiers with the microprocessor 48 via the intermediate means 30 which to some extent play the part of a relay. These intermediate means 30 comprise a qualifier write standardiser or controller 69, and an interface adaptor 70. The interface adaptor 70 is an integrated circuit of the MOTOROLA MC 6820 type. This circuit can accommodate the connection of 2 peripherals. In the system illustrated in the Figure, use is made of only one of these two connection possibilities. The connection possibility utilised is used in the read mode at one time and in the write mode at another time, depending on the orders of the microprocessor. It is obviously perfectly possible to make use of the two connection possibilities and, in this case, each of the possibilities of connection is reserved for one mode of operation: one of the possibilities is reserved for the write mode, the other possibility being reserved for the read mode.

The operation of the integrated circuits 50 to 57, 60 to 67 and 70 is described in the manufacturers' literature. The operation of the write standardiser 69 is explained in the following.

Figure 5:
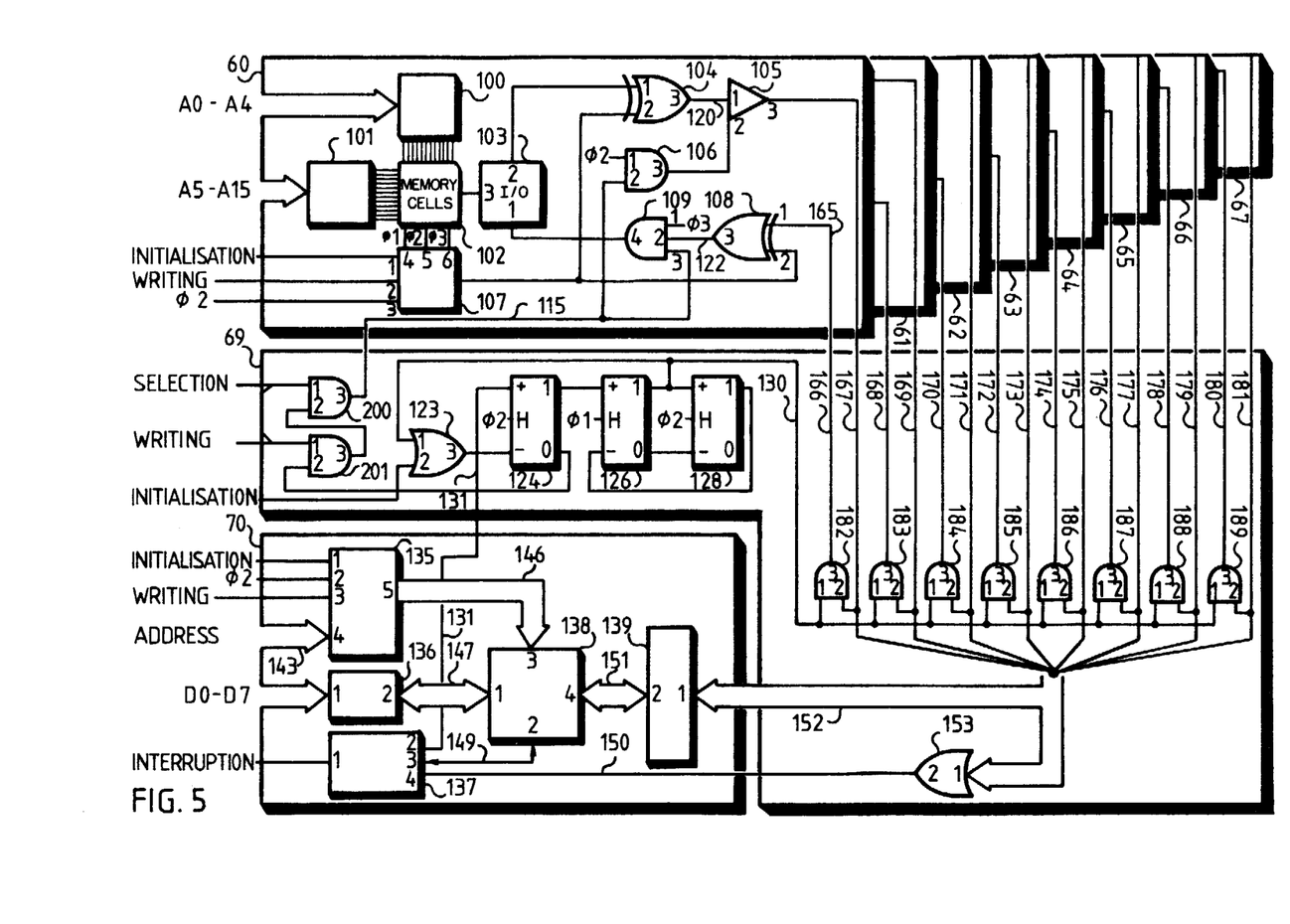
FIG. 5 illustrates the details of the circuits of the qualifier memory and of the associated circuits of the arrangement of FIG. 4.

FIG. 5 is intended to illustrate the operation of the write standardiser 69. This Figure thus incorporates only the circuits directly involved by the operation of this standardiser 69, these being:

the 8 integrated circuits 60, 61, 62, 63, 64, 65, 66, 67 forming the qualifier memory 25, the integrated circuit 70 which is the interface adaptor circuit, the qualifier write standardiser or controller 69, the buses are not illustrated, but the lines utilised are denoted by their mnemonic notations: A0 to A15 for the lines of the address bus 23, D0 to D7 for the lines of the data bus 26, INITIALIS, WRITE, $\phi 1$, $\phi 2$ INTERRUPT for the lines of the control bus 29.

Only the integrated circuit 60 is illustrated in detail in this Figure. The central part is the network 102 of memory cells. The cell which is to be reached for the rear or write operation is addressed on the one hand by the column decoder 100 and on the other hand by the line decoder 101. The column decoder 100 is supplied via the wires A0, A1, A2, A3, A4 of the address bus 23. The line decoder 101 is supplied via the wires A5 to A15 of the address bus 23. The internal clock of this integrated circuit 60 is illustrated at 107. This internal clock 107 receives the "INITIALISAT" initialisation or reset signal at its input terminal 1, the write signal "WRITE" at its input terminal 2 and the timing signal "$\phi 2$" at its input terminal 3. The outputs of this internal clock 107 are: at 4, the timing signal "$\phi 1$" and at 6, the timing signal "$\phi 3$". These three clock or timing signals "$\phi 1$", "$\phi 2$" and "$\phi 3$" are fed to the memory cell network 102 to control the phases of operation of the said memory cells. At 103 are illustrated the data input-output circuits of the memory. These input-output circuits 103 receive at their input terminal 1 the value of the bit which is to be recorded in the case of a write cycle, or the value of the bit which is to be recorded in the case of a "refresher" cycle. The output terminal 2 of the input-output circuit 103 transmits the value of the bit read at the location selected by the address in the case of a read cycle or in the case of a refresher cycle. The terminal 3 of the circuit 105 is connected to the memory cell network 102. In the case of a write cycle or of a refresher cycle, this terminal 3 of the input-output circuit 103 will transmit the value of the bit which is to be recorded or rerecorded to the memory cell network 102. In the case of a read cycle, this terminal 3 will receive from the memory cell network 102 the value of the bit contained in the cell selected by the decoders 100 and 101. The terminal 1 of the input-output circuit 103 is supplied via the output terminal 4 of the gate 109. This conditioner 109 receives at its terminal 1 the timing signal "$\phi 3$" coming from the internal clock 107, a signal transmitted by the terminal 3 of the EXCLUSIVE-OR circuit 108 at its terminal 2, and a selection signal transmitted by the qualifier write controller 69 at its terminal 3. At its input terminal 1, the EXCLUSIVE-OR circuit 108 receives the value of the bit which is to be stored in the case of a write operation, transmitted by the qualifier write controller 69. The terminal 2 of the input-output circuit 103 feeds the input terminal of the EXCLUSIVE-OR circuit 104. This EXCLUSIVE-OR circuit 104 receives a signal transmitted by the internal clock 107 at its input terminal 2. The output terminal 3 of this circuit 104 feeds the input terminal 1 of the controlled amplifier 105. This controlled amplifier 105 receives a signal transmitted by the gate 123 at its control input terminal 2, and its output terminal 3 transmits the value of the bit read, in the case of a read cycle, to the qualifier write controller 69. At its input terminal 1, the gate 123 receives the clock signal $\phi 2$, and at its input terminal 2 a selection signal transmitted by the qualifier write controller 69.

As stated earlier, the integrated circuit 70 of the type MOTOROLA 6820 is formed by the manufacturers for connection of two peripheral units to the buses 23, 26 and 29. In the embodiment described in this example, use is made of one only of these possibilities of connection. The Figures only show the functional assemblies affected by the invention. There are five of these assemblies. A functional control block 135, an upstream buffer register 136, an interruption control block 137, a transfer control block 138 and a downstream buffer register 139. A multiple connection 146 connects the terminal 5 of the functional control block 135 and the multiple terminal 3 of the transfer control block 138. A bus 147 connects the multiple terminal 2 of the upstream buffer register 136 and the multiple terminal 1 of the transfer control block 138. A bus 151 connects the multiple terminal 4 of the transfer control block 138 and the multiple terminal 2 of the downstream buffer register 139. A multiple connection 149 joins the multiple terminal 2 of the transfer control block 138 and the multifilar terminal 3 of the interruption control block 137. The transfer control block 135 furthermore comprises four terminals, of which one is a multiple terminal. The resetting line INITIALISAT is connected to the terminal 1. The clock distribution line $\phi 2$ is connected to the terminal 2. The write control line WRITE is connected to the terminal 3. To the multiple terminal 4 are connected the four address bus 23 line A0, A1, A11, A15 and one SELECTION validation line. The upstream buffer register 136 receives eight upstream lines D0, . . . D7 from the data bus 26 at its multiple terminal 1. The interruption control block 137 receives an interruption demand line INTERRUPT at its terminal 1, a line 131 connected to the (+) input terminal 124 of the bistable circuit of the write standardiser 69 at its terminal 2, and a connection 150 joined to the output terminal 2 of the gates 153 of the write standardiser at its terminal 3. At its muliple terminal 1, the buffer register 139 receives a bus 152 connected to the terminal 1 of the gates 153 and to the terminals 2 of the different gate 182 to 189 in accordance with a distribution which will be set out in the following.

Figure 6:
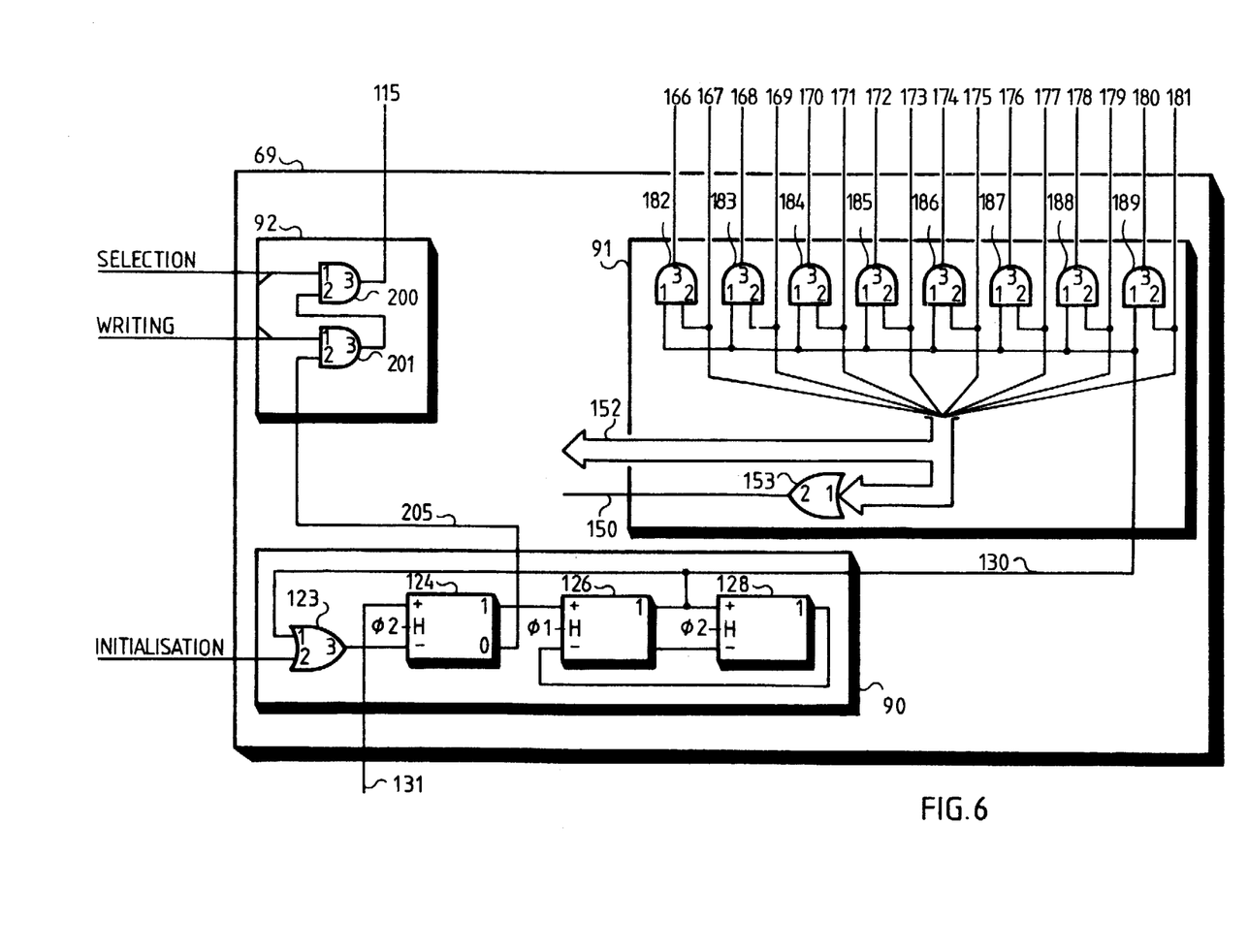
FIG. 6 illustrates the details of the write standardisation controller of FIG. 5.

The write standardiser 69 is equally illustrated in FIG. 6. In this Figure, the circuits of the standardiser are grouped in accordance with their function. The block 90 is the write uniquity control, the block 91 is the block for control of the exchanges between the qualifier memory 25 and the interface adaptor 70, and the block 92 is the block for control of the write operations in the qualifier memory 25. The bistable circuits are illustrated in the Figure with the following convention: the two signal input terminals are denoted by the symbols (+) and (−), and the output terminals by the symbols 1 and 0. The bistable circuit comprises a clock input terminal marked by the letter H.

The write uniquity control block 90 comprises the gates 123, the bistable circuit 124, the bistable circuit 126 and the bistable circuit 128. The terminal 1 of the gates 123 receives the line 130 upstream of the output terminal 1 of the bistable circuit 126 and the terminal 2 receives the resetting line INITIALIS upstream of the control bus 29. The output terminal 3 of the gates 123 is connected to the input terminal (−) of the bistable circuit 124. The input terminal (+) of the bistable circuit 124 is connected to the connection 131. The output terminal 1 of the bistable circuit 124 is connected to the (+) input terminal of the bistable circuit 126. The output terminal 0 of the bistable circuit 124 feeds the line 205 which terminates at the input 1 of the gates 201 of the integrated circuits 60 to 67 of the qualifier memory 25. The (−) input terminal of the bistable circuit 126 is connected to the output terminal 1 of the bistable circuit 128. The output terminal 1 of the bistable circuit 126 is connected to the (+) input terminal of the bistable circuit 128 and the output terminal (0) of the bistable circuit 126 is connected to the (−) input terminal of the bistable circuit 128. At their input terminals H, the bistable circuits 124 and 128 receive the clock signal $\phi 2$, and the bistable circuit 126 receives the clock signal $\phi 1$ at its input terminal H.

The write operations control block 92 comprises a gate 200 and a gate 201 having an inverted output. The inverted output conditioner 201 receives the write control line "WRITE" at its input 1, and at its input 2 it receives the line 205 from the output terminal 0 of the bistable circuit 124. The output terminal of this gate is connected to the input terminal 2 of the gate 200 which receives the SELECTION validation line at its input terminal 1. The output terminal 3 of this gate feeds the line 115 which terminates at the input terminal 3 of the gate 109.

The exchange control block 91 comprises a gate 153 and eight gates 182 to 189. The bus 152 which starts from the downstream buffer register 139 is connected to the gate 153 and to the gates 182 to 189, in the following manner: the bus 152 comprises eight lines corresponding via the interface adaptor 70 with the eight lines of the data bus 26. The terminal 1 of the gate 153 comprises eight inputs each connected to a different line of the bus 152. With regard to the gate 182 to 189, the input terminal 2 of each gate is connected to a different line: the gate 182 to the line corresponding to D0, . . . the gate 189 to the line corresponding to D7. Each of the lines is extended respectively to the integrated circuit corresponding to the bit in question: the line 167 to the circuit 60, the line 169 to the circuit 61, the line 171 to the circuit 62, the line 173 to the circuit 63, the line 175 to the circuit 64, the line 177 to the circuit 65, the line 179 to the circuit 66, and the line 181 to the circuit 67. The output terminals 3 of the gates 182 to 189 are connected respectively to the integrated circuit corresponding to the bit in question: the line 166 to the circuit 60, the line 168 to the circuit 61, the line 170 to the circuit 62, the line 172 to the circuit 63, the line 174 to the circuit 64, the line 176 to the circuit 65, the line 178 to the circuit 66 and the line 180 to the circuit 67.

No particular explanation of the operation of the integrated circuits 60, 61, 62, 63, 64, 65, 66, 67, 70 will be given in the description of the operation of the circuits. These are described in particular in the various documents supplied by the manufacturers MOTOROLA. The following explanations are limited to an elucidation of the operation of the particular circuits of the invention.

It should be observed that on technological grounds, the MOTOROLA documentation sometimes makes use of inverted signals which are referred to as inverted signals by contrast to direct signals. For example, this is the case for the initial state restoration signal which is a RESET signal. For the sake of clarity of the description and to simplify the explanations, only the direct values of the signals will be considered in the following, it being understood that it is the appropriate value which is used in actual operation. For example, it is said in the following explanations that the initial state restoration is performed by means of an INITIALISATION signal which is a direct signal.

The restoration of the initial state of the write standardisation controller 69 is performed by applying an INITIALIS signal to the input terminal 2 of the gate 123. This signal traverses the gate 123 to enter via the (−) terminal of the bistable circuit 124 which is synchronised by the clock signal $\phi 2$. The bistable circuit 124 will consequently have its output terminal 1 change to zero on the falling edge of the clock signal $\phi 2$. The resetting operation has no effect on the bistable circuits 126 and 128 since these two bistable circuits reset each other to the initial state.

As a matter of fact, if the output terminal 7 of the bistable circuit 126 is high, this supposes that the output terminal 1 of the bistable circuit 128 is low, since this output terminal 1 of the bistable circuit is connected to the (−) input terminal of the bistable 126. Consequently, if the output terminal 1 of the bistable 126 is at a high level, this level is transmitted to the (+) input terminal of the bistable circuit 128. This causes the output terminal 1 of the bistable circuit 126 to be changed to a low level. The reset to the initial state is performed automatically.

In the first place, the operation of the invention is examined in the case of the writing of a qualifier in the qualifier memory 25.

When the microprocessor 48 is due to load a qualifier into the qualifier memory 25, it must undertake two operations. Firstly, it must load the qualifier into the interface adaptor circuit 70. Subsequently, it must order a write cycle at the data memory 24. This write cycle should be performed at the address of the data item which is to be qualified. The execution of this write cycle in the data memory 24 induces the execution in parallel of a write cycle in the qualifier memory 25. During this parallel write cycle, the qualifier which had been stored in the interface adaptor circuit 70 is stored at the associated address of the qualifier memory 25.

To load the qualifier into the interface adaptor circuit 70, the microprocessor 48 performs the following operations:

it places the address of the interface adaptor circuit 70 on the address bus. For an interface adaptor circuit 70 of the MOTOROLA MC 6820 PIA (0980) type, this address is defined by the lines A0, A1, A11 and A15 which are connected respectively to the terminals RS0, RS1, CS0, CS2 of the interface adaptor circuit 70.

it places on the data bus 26 the configuration of the qualifier which is to be loaded at the associated address: the bit 0 on the line D0, . . . the bit 7 on the line D7.

The microprocessor 48 places on the control bus 29:
a write cycle actuation signal on the line marked WRITE. When this line is brought to a positive potential, this means that the processor 48 requests a write cycle, whereas it is a read cycle which is requested if this line is brought to zero voltage.

a validation signal on the line marked SELECTION. This signal authorises the transfer of the address into the interface adaptor circuit 70.

a clock signal $\phi 2$ to synchronise the operation of the interface adaptor circuit 70.

Having recognised its address on its multiple terminal 4 and receiving a write order at its terminal 3, the functional control block 135 places on its multiple terminal 5 the orders to be transmitted to the transfer control block 138. These orders are transmitted via the multiple connection 146 to the terminal 3 of the transfer control block 138. In response to these orders, the transfer control block 138 organises the internal circuits of the interface adaptor circuit 70 so that the contents of the upstream buffer register 136 are transmitted to the downstream buffer register 139 via the multiple connection 147, then via the transfer control block 138 and finally via the multifilar connection 151. In this way, the qualifier pattern D0 to D7 which had been placed on the data bus 26 is contained in the downstream buffer register 139. At its multiple terminal 1 and thence via the multiple connection 152, this downstream buffer register 139 transmits the D0 to D7 pattern of the qualifier to the write standardisation controller 69. Furthermore, the transfer control block 138 informs the interruption control block 137 of the satisfactory completion of the transfer of the qualifier into the downstream buffer register 139. To this end, the transfer control block 138 places a satisfactory transfer completion signal on its terminal 2, this signal passes via the connection 149 into the terminal 3 of the interruption control block 137. In response to this signal, the interruption control block 137 transmits a signal from its terminal 2 and via the connection 131 to the write standardisation controller 69, apprising the latter that the qualifier pattern is available at the connection 152. To summarise, the interface adaptor circuit 70 has put the qualifier pattern at the connection 152 and has informed the write standardisation controller 69 of this fact via the connection 131.

During the preceding operation, the microprocessor 48 had transmitted to the interface adaptor 70 the pattern of the qualifier to be stored in the qualifier memory 25. As soon as this transfer is completed, it has been shown that the interruption control block 137 informed the write standardisation controller 69 of this fact by dispatching a signal on the connection 131, which reaches the (+) terminal of the bistable circuit 124 present in the write uniquity control 90. Under the action of this effect, the bistable circuit 124 changes state and its output terminal 1 changes to a high level on the dropping flank of the clock signal $\phi 2$. The significance of this high level for the write uniquity control block 90 is that the pattern of the qualifier is available at the output terminal of the interface adaptor circuit 70, on the bus 152. The output terminal 1 of the bistable circuit 124 is connected to the (+) input terminal of the bistable circuit 126. The bistable circuit 126 consequently changes state and its output terminal 1 will change to a high level on the falling edge of the clock $\phi 1$. The output terminal 1 of the bistable circuit 126 is connected to the line 130. When it is at a high level, this line 130 authorises the passage of the pattern contained in the bus 152 through the series of gates 182, 183, 184, 185, 186, 187, 188, 189 which control the passage towards the input lines 166, 168, 170, 172, 174, 176, 178, 180 of the bits to be written in the circuits 60, 61, 62, 63, 64, 65, 66, 67. The gates 182, . . . 189 consequently remain open throughout all the period in which the output terminal of the bistable circuit 126 is at a high level. It is this period which is exploited by the microprocessor to request a write cycle in the data memory 24 and in the qualifier memory 25. As will be apparent in the following, this cycle is controlled by the write operations control block 92. The bistable circuit 128 has its (+) input terminal connected to the output terminal 1 of the bistable circuit 126: the change of this output terminal to a high level causes the bistable circuit 128 to change state, its output terminal 1 changing to a high level on the falling edge of the clock signal $\phi 2$. This high-level output indicates that it is possible to perform the writing of the pattern of the qualifier. The output terminal 1 of the bistable circuit 128 feeds into the input terminal (−) of the bistable circuit 126 whose output terminal 1 changes to a low level on the falling edge of the clock signal $\phi 1$. The output terminal 0 of the bistable circuit 126 has changed to a high level and transmits this level to the (−) input terminal of the bistable circuit 128 which changes state: its output terminal 1 changes to a low level. The write unit control block 90 has been reset to its initial state. The output terminal 1 of the bistable circuit 126 which controls the line 130 being at a low level, causes the closing of the gates 182 to 189 of the block 91 controlling the exchanges between the qualifier memory 25 and the interface adaptor circuit 70. The closing of these gates thus isolates the qualifier memory 25 from the interface adaptor circuit 70. The conditioners were open only during the period of a write cycle as will clearly become apparent from FIG. 7 which illustrates the time chart of the signals applied during a write cycle in the qualifier memory 25.

The write operations control block 92 receives from the write unit control block 90 a line 205 which starts from the terminal 0 of the bistable circuit 124 and which terminates at the input terminal 2 of the inverted-output gate 201. When the output terminal 1 of the bistable circuit 124 is at a low value, which denotes that there is no qualifier pattern available in the interface adaptor circuit 70, the output terminal 0 of this bistable circuit is at a high value. Under these conditions, the input terminal 2 of the gate 201 receives a positive signal. If a write order WRITE is sent by the microprocessor 48 to the input terminal 1 of the gate 201, the output terminal 3 of the same is at a low level since the two initial conditions are fulfilled. The output terminal 3 of the gate 201 retransmits the low level to the input terminal 2 of the gate 200 which is consequently closed. The gate 200 being closed, the SELECTION validation signal is not transmitted to the output terminal 3 of this gate and is not therefore transmitted on the line 115 which operates the gate 109 and 123 of the qualifier memory 25. As set forth in the MOTOROLA documents relating to the MCM 6605A circuits, the absence of the SELECTION signal in the presence of a WRITE order causes the execution of a cycle for restoration of the contents of the address called. It is thus apparent that the call for a write cycle in the absence of a qualifier pattern in the interface adaptor circuit 70 causes a restoration or refresher cycle. There is no alteration of the contents of the qualifier memory 25, but on the contrary a restoration occurs of the level of the signals stored.

In the case in which a low-level signal is received on the line 205 by the write operations control block 92, which indicates that a qualifier pattern is available at the output terminal of the interface adaptor circuit 70, the output terminal 3 of the conditioner 201 is at a high value because its input terminal 2 is at a low value. The gate 200 is thus open and the SELECTION validation signal passes through the same to feed the line 115. The line 115 being at a high level, the qualifier memory 25 can execute a normal write cycle.

In the case in which the write operations control block 92 receives a low-level signal at the terminal 1 of the gate 201, which indicates the presence of a read cycle, the output terminal 3 of the gate 201 is raised to a high level. As before, the gate 200 will be open and the qualifier memory 25 can execute a read cycle since the SELECTION validation signal may raise the line 115 to a high level.

The block 91 for control of the exchanges between the qualifier memory 25 and the interface adaptor circuit 70 controls these exchanges in the case of the write mode as well as in that of the read mode.

In the case of the write function, it was apparent that the interface adaptor circuit 70 places the qualifier pattern which is to be stored on the bus 152 which is connected line-by-line to the gates 182 to 189: the line corresponding to the bit 0 of the qualifier feeds the input terminal 1 of the conditioner 182 and so forth up to the line corresponding to the bit 7 which feeds the input terminal 1 of the conditioner 189. The gates 182 to 189 are controlled via their input terminals 2 which are connected to the line 130. It was observed that this line 130 is at a high level during the period of a write cycle subject to the condition that a qualifying pattern should be available on the bus 152. If this condition is established, the line 130 is at a high level and the contents of the lines will be transmitted to the integrated circuit 60 to 67 corresponding to the same, from the output terminals 3 of the gates 182 to 189 and via the lines 166, 168, 170, 172, 174, 176, 178, 180.

If the qualifier pattern is not available at the output side of the interface adapter circuit 70, the line 130 will be brought to a low level and the conditioners 181 to 189 will be closed: the intercommunication between the interface adaptor circuit 70 and the qualifier memory 25 is interrupted.

In the case of a read cycle, the qualifier memory 25 places the bits read via the integrated circuits 60 to 69 on the lines 167, 169, 171, 173, 175, 177, 179, 181: the bit 0 on the line 167 and thus in sequence up to the bit 7 on line 181. These lines lead direct to the bus 152 on the one hand, and on the other hand to the multiple terminal 1 of the gate 153. The bus 152 places the pattern read in the qualifier memory 25 at the multiple terminal 1 of the downstream buffer register 139. If at least one of the signals fed to its input side has a high level, the gate 153 established a high-level signal at its terminal 2. This signal is transmitted via the line 150 to the terminal 4 of the block 137. This block 137 records a high-level signal at its terminal 1 which is connected to the interruption request line INTERRUPT. In this manner, the microprocessor 48 is informed of the presence of a qualifier pattern available at the input side of the interface adaptor circuit 70.

In the case in which all the lines connected to the input terminal 1 of the gate 153 have a low level, this means that there is no qualifier at the address associated with the address scanned, the output terminal 2 of the gate remains at a low level and there is no interruption request.

Figure 7:
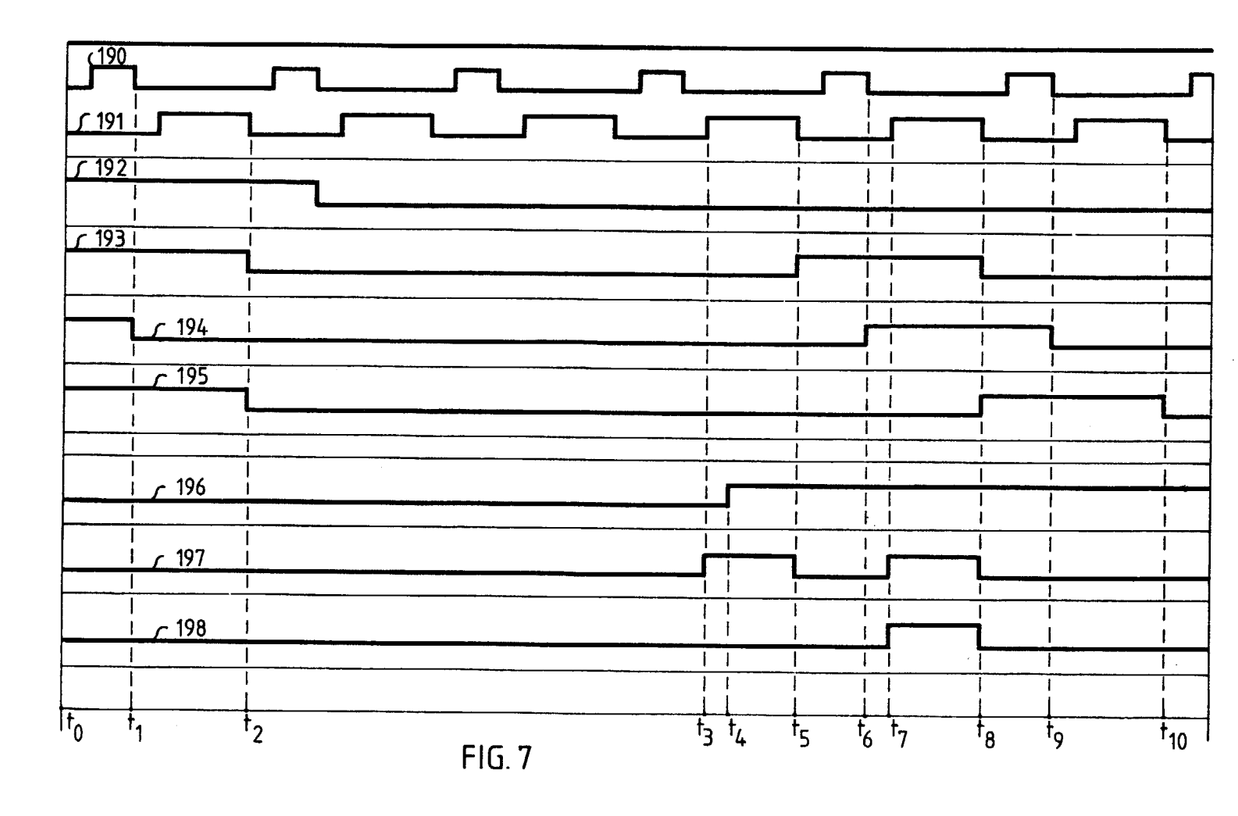
FIG. 7 illustrates the time chart of the electrical signals occurring in the operation of the preceding circuits in the case of writing the qualifiers into the memory.

FIG. 7 illustrates the time diagram of the principal electrical signals present in the preceding circuits during the writing of a qualifier in the qualifier memory 25.

The signals illustrated are:

at 190, the lock signal $\phi 1$, at 191, the clock signal $\phi 2$, at 192, the signal INITIALIS for reset to the initial state, at 193, the signal at the output terminal 1 of the bistable circuit 124, at 194, the signal at the output terminal 1 of the bistable circuit 126, at 195, the signal at the output terminal 1 of the bistable circuit 128, at 196, the signal carried by the connection 131, at 197, the WRITE signal for actuation of the write cycle, at 198, the memory selection SELECTION signal.

The time $t_o$ is the system start time. It has

PROCESS AND DATA SYSTEM USING DATA QUALIFIERS ABSTRACT OF THE DISCLOSURE

A data processing method of operation and system uses a processor, an addressable data memory, and an addressable qualifier read-write memory. As a data word is written into or read out of the data memory, a qualifier associated with the data word may be simultaneously respectively written into or read out of the qualifier memory. The qualifiers are dependent on characteristics of the data word which is qualified or the processing undergone by the data word. An address bus and control bus cause the simultaneous inputting and outputting of data and qualifiers to and from the data memory and qualifier memory respectively. An intermediate storage means is used for inputting and outputting qualifiers to and from the qualifier memory. The intermediate storage means includes an interface adapter which interfaces the qualifier memory to the processor as though the qualifier memory is a peripheral I/O device. An INTERRUPT is used to alert the processor of the reading of a qualified data word.

This signal 196 is applied to the (+) input terminal of the bistable circuit 124 which switches over on the falling edge of the clock signal $\phi 2$: this is what happens on the signal 193 at the instant $t_5$. The output terminal 7 of the bistable circuit 124 being at a high value, this causes the bistable circuit 126 to switch over on the falling edge of the clock signal $\phi 1$; this is what occurs on the signal 194 at the instant $t_6$.

This high-value signal 194 means that it is possible to write the qualifier into the qualifier memory 25. The microprocessor 48 controls the performance of a write cycle in the qualifier memory 25 by placing a write pulse WRITE situated between $t_7$ and $t_8$ on the signal 197. During the same period of time, the microprocessor 48 validates the write cycle in the qualifier memory 25 by placing, on signal 198, a SELECTION pulse which will authorise the performance of the write cycle.

The output terminal 1 of the bistable circuit 126 being at a high value, the same causes the bistable circuit 128 to switch over on the falling edge of the clock signal $\phi 2$, which is what happens on signal 195 at the instant $t_8$. At the same time, the output terminal 1 of the bistable circuit 126 supplies the connection 130 which on the one hand feeds to the interchange control block 91 and on the other hand feeds to the (−) input terminal of the bistable circuit 124 which switches over on the falling edge of the clock signal $\phi 2$. This is what happens on signal 193 at the instant $t_8$. The output terminal 1 of the bistable circuit 124 has changed to a low value.

The output terminal 1 of the bistable circuit 128 being at a high value will cause the bistable circuit 126 to switch over on the falling edge of the clock signal $\phi 1$, which is what happens on signal 194 at the instant $t_9$. The switching over of this bistable circuit causes a change to a low level of the signal 194 which is conveyed via the connection 130 and which actuates the intercommunication between the interface adaptor circuit 70 and the qualifier memory 25: the low level means that the intercommunication is interrupted.

The output terminal 0 of the bistable circuit 126 having changed to a high value, this causes a changeover of the bistable circuit 128 of which the output terminal 1 changes to a low level on the falling edge of the clock signal $\phi 2$. This is what occurs on signal 195 at the instant $t_{10}$. The write standardisation controller 69 has reverted to the state it had prior to the instant $t_5$ and is ready to fulfil a renewed request for a cycle for writing a qualifier into the qualifier memory.

We claim:

1. A method of operation of a data processing system including a processor, an addressable data memory having a plurality of addresses, an addressable qualifier read-write memory for storing a plurality of qualifiers generated by said processor, and an intermediate storage means; said processor, said data memory, said qualifier read-write memory, and said intermediate storage means being operatively interconnected by a control bus and an address bus; said processor, said data memory, and said intermediate storage means operatively interconnected by a data bus; said qualifier read-write memory and said intermediate storage means operatively interconnected by a qualifier bus; and each qualifier has an address within said qualifier read-write memory which is the same as an associated predetermined one of said addresses within said data memory, the steps comprising:
   (a) storing a qualifier in said intermediate storage means, said qualifier being provided to said intermediate storage means from said processor by way of said data bus;
   (b) simultaneously addressing said data memory and said qualifier read-write memory by placing an address signal on said address bus, and
   (c) writing the qualifier from said intermediate storage means into said qualifier read-write memory by way of said qualifier bus and at an an address determined by the address signal, while simultaneously writing an associated qualified data word into said data memory at an address determined by the address signal such that said qualifier and said qualified data word are associated by having the same address respectively within said qualifier read-write memory and said data memory, and wherein each of the qualifiers is characteristic of the data or processing undergone by the data in an associated predetermined address.

2. The method of claim 1 wherein the processor writes a plurality of different qualifiers into said qualifier read-write memory, each qualifier associated with a qualified data word and having an address within said qualifier read-write memory which is the same as an associated predetermined one of said addresses within said addressable data memory.

3. The method of claim 2 further including the steps of:
   reading one of said qualified data words from said data memory while simultaneously storing the associated qualifier in said intermediate storage means by operation of said qualifier read-write memory outputting the qualifier on said qualifier bus, and sending an informing signal to said processor to inform said processor of the reading of a qualified data word.

4. The method of claim 3 wherein, upon said processor addressing an address associated with a qualifier, the qualifier associated with the addressed address is sent to said processor following the sending of said informing signal.

5. The method of claim 4 wherein upon said processor addressing an address associated with a qualifier said address bus simultaneously addresses said qualifier read-write memory which sends the qualifier associated with the addressed address from said qualifier read-write memory to said intermediate storage means.

6. The method of claims 4 or 5 wherein said informing signal is an INTERRUPT.

7. A data processing system comprising:
   (a) a processor,
   (b) an addressable data memory having a plurality of addresses,
   (c) an addressable qualifier read-write memory for storing a plurality of qualifiers generated by said processor, each stored qualifier having:
      (i) an address within said qualifier read-write memory which is the same as an associated predetermined one of said addresses within said data memory, and
      (ii) an associated qualified data word stored at said associated predetermined one of said addresses within said data memory, and each qualifier being dependent on characteristics of the associated data word or the processing undergone by that data word,
   (d) an intermediate storage means for storing qualifiers being sent in either direction between said qualifier read-write memory and said processor,
   (e) an address bus, control bus, data bus, and qualifier bus, said data bus operatively interconnecting said processor, said data memory and said intermediate storage means, said address bus and said control bus operatively interconnecting said processor, said intermediate storage means, said data memory, and said qualifier read-write memory for inputting and outputting data and qualifiers respectively to and from said data memory and said qualifier read-write memory, said qualifier bus operatively interconnecting said intermediate storage means and said qualifier read-write memory by said qualifier bus, said address bus adapted to simultaneously address a qualifier within said qualifier read-write memory and the associated qualifier data word within said data memory such that a qualifier and the associated qualified data word can be simultaneously written in the qualifier read-write memory and the data memory respectively,
   (f) a qualifier detection means which detects the outputting of a qualifier from said qualifier read-write memory, the outputting of a qualifier occurring when said address bus and said control bus cause the outputting of a qualified data word from said data memory, and wherein said control bus and said address bus cause said intermediate storage means to:

I. output a qualifier on said qualifier bus simultaneous with the writing of the associated qualified data word in said data memory, and II. store a qualifier from said qualifier bus simultaneous with the reading of the associated qualified data word from said memory.

8. The system of claim 7 wherein said processor includes a processing circuit for processing data, an address circuit connected to said address bus to address said data memory and said qualifier read-write memory, and an input/output buffer register connected to the processing circuit to temporarily store data which is to be exchanged between said processing circuit and said data memory.

9. The system of claim 8 wherein said intermediate storage means includes an addressable interface adaptor, said adaptor interfacing said processor and said qualifier memory.

10. The system of claim 9 wherein the system is comprised of integrated circuit chips.

11. The system of claim 8 wherein said qualifier detection means triggers the sending of an informing signal to inform said processing circuit of the outputting of a qualifier from said qualifier read-write memory.

12. The system of claim 11 wherein said intermediate storage means includes an addressable interface adaptor, said interface adaptor interfacing said processor and said qualifier read-write memory, said informing signal is an INTERRUPT generated by said interface adaptor, and each of said qualifiers is characteristic of the data or the processing undergone by the data in an associated predetermined address.

13. The system of claim 12 wherein upon said address bus addressing one of said predetermined addresses within said data memory, the associated qualifier is input into said interface adaptor of said intermediate storage means from said qualifier read-write memory.

14. The system of claim 13 wherein said intermediate storage means includes a qualifier write controller connected between said interface adaptor and said qualifier read-write memory.

15. The system of claim 14 wherein said qualifier write controller includes a flip-flop and a plurality of gates, said flip-flop having an output which controls said gates, said gates controlling a transfer of said qualifiers from said interface adaptor to said qualifier read-write memory.

16. The system of claims 14 or 15 wherein said qualifier write controller includes a plurality of flip-flops.

* * * * *